US007990259B2

(12) United States Patent
Pobuda et al.

(10) Patent No.: US 7,990,259 B2
(45) Date of Patent: Aug. 2, 2011

(54) IGNITION KEY WITH RECORDED MESSAGE

(76) Inventors: David Wayne Pobuda, Bangor, MI (US); Darwin Todd Willbrandt, Waterford, MI (US)

( * ) Notice: Subject to any disclaimer, the term of this patent is extended or adjusted under 35 U.S.C. 154(b) by 181 days.

(21) Appl. No.: 12/021,567

(22) Filed: Jan. 29, 2008

(65) Prior Publication Data

US 2009/0189755 A1 Jul. 30, 2009

(51) Int. Cl.
*B60Q 1/00* (2006.01)

(52) U.S. Cl. ..................... 340/457; 340/932.2; 340/988; 340/996

(58) Field of Classification Search .................. 340/457, 340/5.64, 932.2, 988, 996, 5.6; 701/36; 367/198
See application file for complete search history.

(56) References Cited

U.S. PATENT DOCUMENTS

| | | | | |
|---|---|---|---|---|
| 4,503,528 | A | 3/1985 | Nojiri et al. | |
| 5,819,568 | A * | 10/1998 | Christie et al. | 70/395 |
| 6,008,723 | A * | 12/1999 | Yassan | 340/438 |
| 6,160,319 | A * | 12/2000 | Marougi et al. | 307/10.5 |
| 7,245,997 | B2 * | 7/2007 | Kitao et al. | 701/29 |
| 7,548,491 | B2 * | 6/2009 | Macfarlane | 367/198 |
| 2005/0012594 | A1 * | 1/2005 | Shim | 340/5.72 |
| 2006/0103542 | A1 * | 5/2006 | Ratnakar | 340/692 |

FOREIGN PATENT DOCUMENTS

| | | | |
|---|---|---|---|
| JP | 2000-325222 | A | 11/2000 |
| KR | 20-0249792 | Y1 | 11/2001 |
| KR | 20-0301011 | Y1 | 1/2003 |
| KR | 10-2005-0052841 | A | 6/2005 |

* cited by examiner

*Primary Examiner* — Jennifer Mehmood
*Assistant Examiner* — Hongmin Fan
(74) *Attorney, Agent, or Firm* — McGarry Bair PC

(57) ABSTRACT

A vehicle ignition key includes a shank portion securely attached to a grip portion including a housing with an exterior housing surface. An actuation switch includes a switch contact surface complementary with the exterior housing surface, and is electrically coupled with a digital message controller and a power source. The housing defines a chamber which can hold the digital message controller, the power source, and/or a message generator. The message generator can transmit a message from the digital message controller. Actuation of the actuation switch upon rotation of the ignition key in the ignition switch is facilitated by the complementary surfaces, and initiates processing of stored data and transmission of the digitized data from the digital message controller to the message generator.

17 Claims, 7 Drawing Sheets

IGNITION KEY WITH RECORDED MESSAGE

BACKGROUND OF THE INVENTION

Description of the Related Art

Ignition keys are ubiquitous for motorized vehicles, and are primarily utilized to start the vehicle. However, actuating an ignition switch can also trigger an audio or visual signal to remind the operator to take some action, such as fasten a seat belt. However, a simple audio or visual signal can easily be ignored, and may be limited in its effectiveness in conveying a selected message.

SUMMARY OF THE INVENTION

A vehicle ignition key includes a shank portion, a grip portion, at least one electric actuation switch, a digital message controller, a power source, and a message generator. The shank portion can be coupled with a vehicle ignition switch. The grip portion is securely attached to the shank portion, and includes a housing defining at least one chamber and including an exterior housing surface. The actuation switch is integrated into the housing and includes a switch contact surface complementary with the exterior housing surface. The complementary surfaces facilitate actuating the actuation switch when the grip portion is grasped and the ignition key is rotated in the ignition switch.

The digital message controller is electrically coupled with the at least one electric actuation switch, and includes memory for storing digitized data therein and a processor for processing the digitized data. The power source is electrically coupled with and supplies power to the actuation switch and the digital message controller. The message generator is electrically coupled with the digital message controller for transmitting a message to an occupant of a vehicle. The at least one chamber can hold at least one of the digital message controller, the power source, and the message generator. The actuation switch is actuated to initiate processing of the stored digitized data and transmission of the processed digitized data from the digital message controller to the message generator upon rotation of the vehicle ignition key in a vehicle ignition switch.

DESCRIPTION OF EMBODIMENTS OF THE INVENTION

Figure 1:
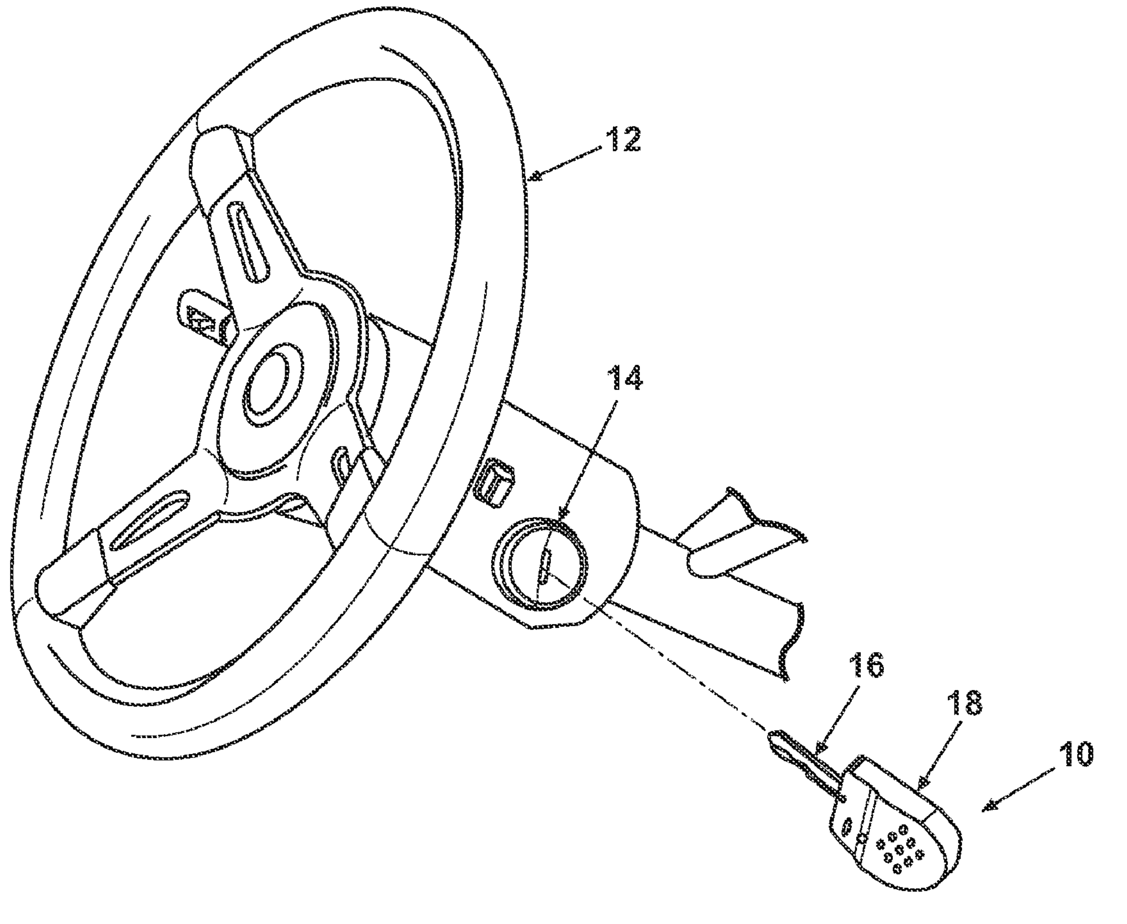
FIG. 1 is a perspective view of a motorized vehicle steering assembly and a first embodiment of a message-generating ignition key according to the invention.

Referring to the drawings, and in particular to FIG. 1, a first embodiment of the invention comprising a message-generating ignition key 10 is illustrated for engagement in a conventional manner with a known motorized vehicle steering assembly 12, comprising a known ignition switch 14. The invention is illustrated and described for use in an automobile (not shown), although the invention can be adapted for use in other motorized vehicles, such as trucks, motorcycles, all-terrain vehicles, boats, aircraft, and the like.

Figure 2:
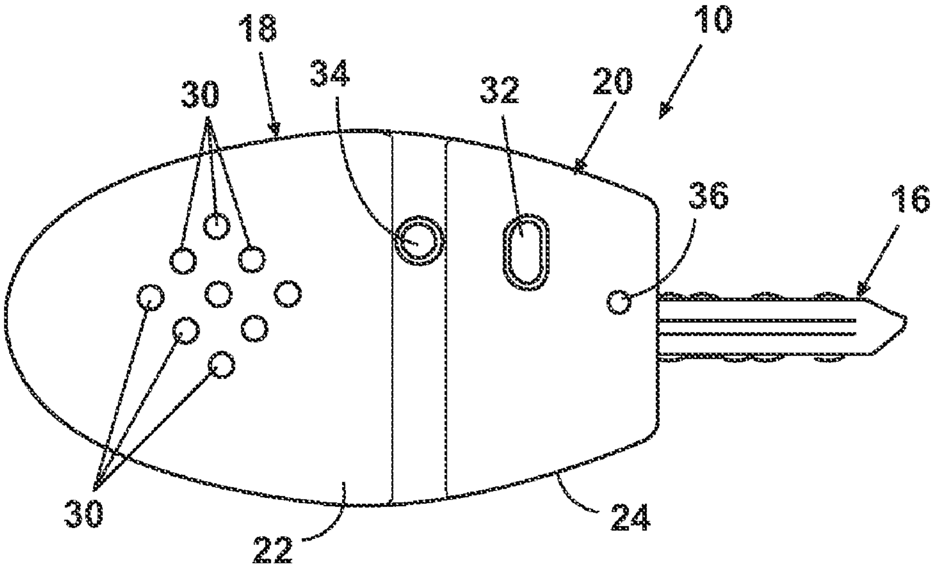
FIG. 2 is an enlarged plan view of the message-generating ignition key illustrated in FIG. 1, comprising a toothed shank portion and a housing.

The ignition key 10 illustrated in FIG. 1 shares several features of a conventional ignition key, including a toothed shank portion 16 and a grip 18. The shank portion 16 is an elongated, generally well-known member having a conventional configuration for operable engagement with the ignition switch 14. Referring to FIG. 2, the grip 18 can comprise a housing 20 having an obverse face 22 and an opposed reverse face 24. The reverse face 24 is defined by a cover 26 (FIG. 4), as hereinafter described.

Figure 4:
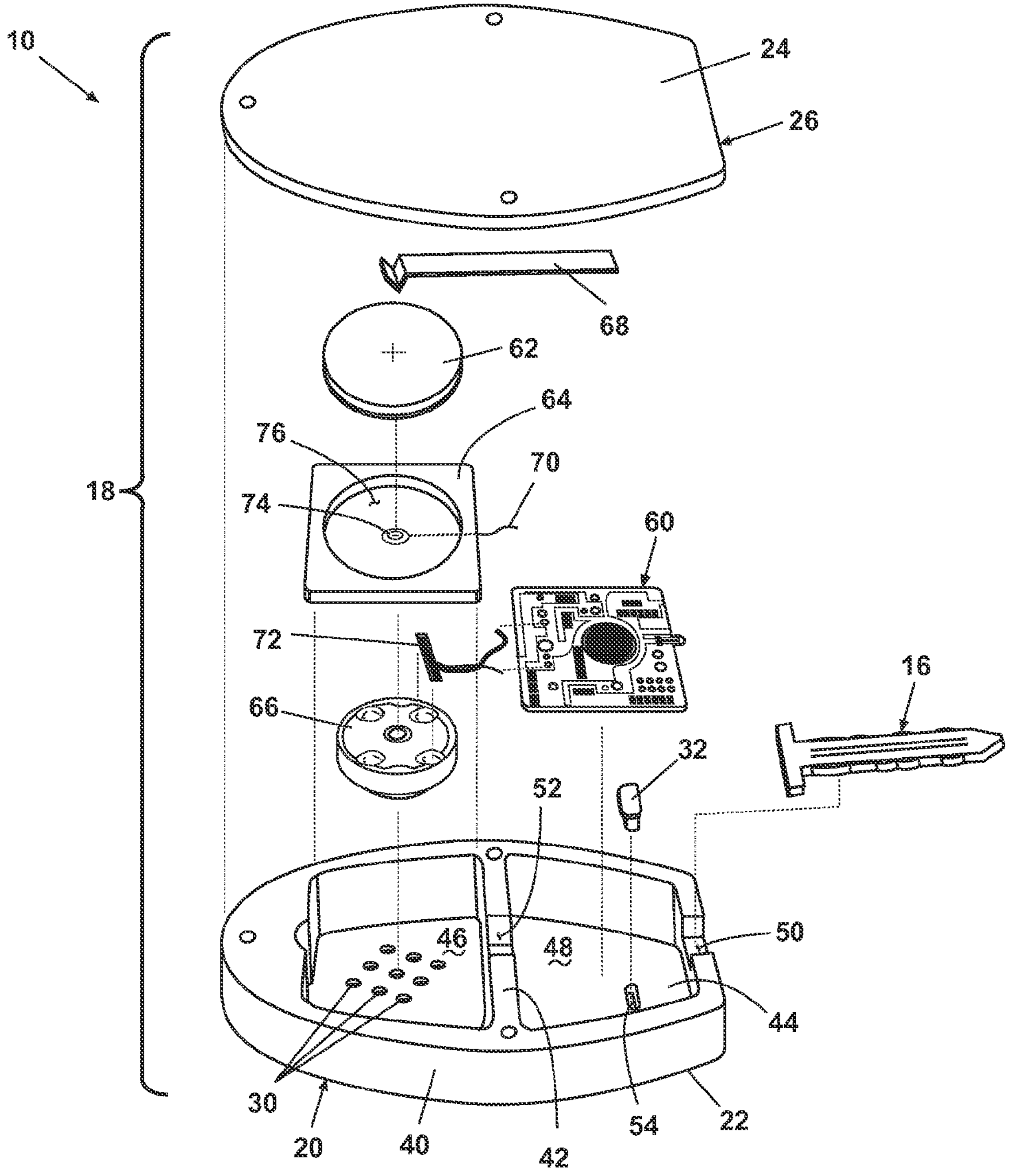
FIG. 4 is an exploded view of the message-generating ignition key illustrated in FIG. 1, showing the housing, a housing cover, and a controller, a speaker, a battery, and connecting elements comprising the ignition key.

The obverse face 22 is provided with a plurality of speaker apertures 30 extending therethrough. An actuation switch 32 extends through the obverse face 22 near the shank portion 16. The actuation switch 32 is positioned in the grip 18 so that a user grasping the grip 18 will actuate the switch 32. The switch 32 can be a spring-biased, single-action switch which closes a circuit when depressed, and opens a circuit when released. As illustrated in FIG. 4, the switch 32 can extend through a switch aperture 54 in the obverse face 22.

Figure 3:
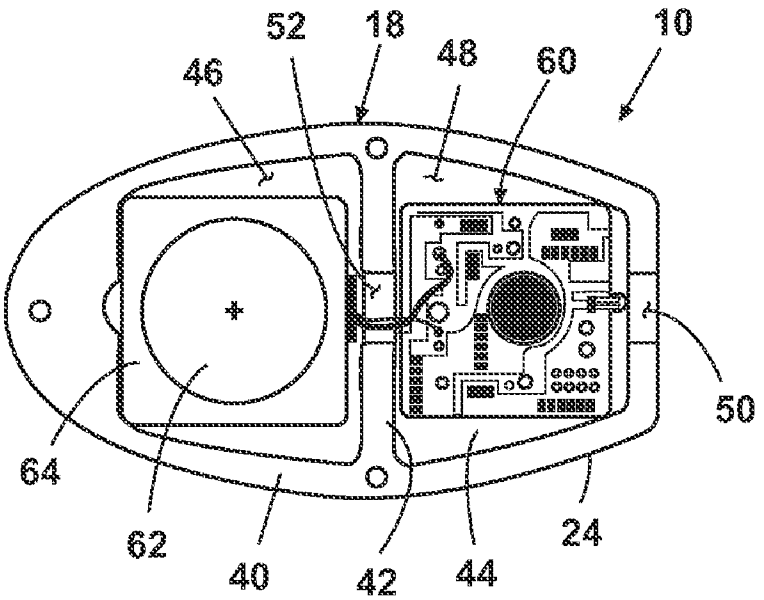
FIG. 3 is a plan view of the message-generating ignition switch illustrated in FIG. 2, showing the interior of the housing.

Referring now to FIG. 3, the housing 20 comprises a perimeter wall 40 extending along the perimeter of a generally planar reverse wall 44 defining the obverse face 22. The perimeter wall 40 is illustrated as somewhat elliptical in shape. However, the perimeter wall 40 can have any shape, such as circular or rectilinear, providing a selected aesthetic appearance and functionality, as described herein. The perimeter wall 40 is transected by a transverse wall 42 dividing the housing into a speaker chamber 46 and a controller chamber 48. The perimeter wall 40 is intersected with a shank portion slot 50 at one end of the grip 18, and the transverse wall 42 is intersected at approximately mid-length with a wiring slot 52. The shank portion slot 50 is adapted for coupling of the shank portion 16 with the grip 18. The wiring slot 52 is configured to accommodate electrical wiring and other components extending between the speaker chamber 46 and the controller chamber 48.

The controller chamber 48 is adapted for receipt of a controller 60 therein. The controller 60 can comprise a processor, memory, and associated operational components for storing and processing binary data in a generally well-known manner. The controller 60 is illustrated in FIG. 3 as a circuit board. However, the controller 60 can comprise an integrated circuit, a microprocessor, or any other electronic device capable of storing and processing binary data in a controlled manner. It will be evident that a preferred controller will be sufficiently small in order to minimize the size of the grip 18.

Referring also to FIG. 4, the speaker chamber 46 is adapted for receipt of a message generator, such as a speaker 66, and a power source 62, such as a battery. The speaker 66 can be a known speaker having a size, configuration, and operational specifications suitable for the purposes described herein. An example of a suitable speaker is a Model No. M10H4.5A8DRJ10, manufactured by Union Team Limited. The battery can be a known wafer-type battery, such as a watch or calculator battery, hearing aid battery, or the like, having a size and power output suitable for the purposes described herein, in particular to minimize the size of the grip 18.

The speaker 66 is oriented in the speaker chamber 46 so that the speaker 66 can broadcast sound through the speaker apertures 30. The speaker 66 can be operably coupled with the controller 60 through a suitable wiring harness 72 for broadcasting signals from the controller 60. Overlying the speaker 66 is an isolator plate 64 fabricated of an electrically inert material, such as a nylon, adapted to electrically insulate the speaker 66 from the battery 62.

The isolator plate 64 is a generally platelike body adapted for slidable receipt in the speaker chamber 46, and having a battery cavity 76 for seating of the battery 62 therein. The isolator plate 64 can be provided with a contact 74, preferably in the center of the battery cavity 76, electrically coupled with an electrical lead 70 extending away from the isolator plate 64. The electrical lead 70 can be operably coupled to the controller 60 for delivering power from the battery 62 to the controller 60. The contact 74 can be adapted for electrical contact with the negative terminal of the battery 62 when the battery 62 is seated in the battery cavity 76.

A contact strip 68 can also be operably coupled to the controller 60 so that the contact strip 68 will electrically contact the positive terminal of the battery 62 when the controller 60 and the battery 62 are installed in the housing 20. The contact strip 68 can comprise an electrically-conductive material, such as copper, in a thin, strap-like configuration, and spring-biased into contact with the battery 62. The contact strip 68 can be adapted for lateral pivoting away from the battery 62 for removal and replacement of the battery 62. When assembled, the contact strip 68 can contact the positive terminal of the battery 62, and the contact 74 can contact the negative terminal of the battery 62, to complete an electrical circuit to provide power to the controller 60 and the speaker 66.

The wiring harness 72, the electrical lead 70, and the contact strip 68 can all extend through the wiring slot 52 for coupling with the controller 60. The actuation switch 32 can be electrically coupled in the circuit and adapted in a known manner for actuating a suitable micro-switch (not shown) on the controller 60.

A message can be stored digitally in the controller 60 memory in a known manner. When the actuation switch 32 is depressed, the controller 60 can process the digital message, and transmit the message through the wiring harness 72 to the speaker 66, where it will be broadcast through the speaker apertures 30. The message can comprise a preselected message, such as "Fasten seatbelts," "Check oil," or "Don't drink and drive." The message can be pre-recorded on the controller 60. Different keys can comprise different messages, so that an operator can select a specific key for a specific message.

The controller 60 can also be adapted for selective recording of a message, such as by the operator. In such a case, the message can be recorded on a computer and stored in the key 10 from the computer through a USB connection mounted in the perimeter wall 40, or a known Wi-Fi connection. Alternatively, the message can be recorded and stored in memory on the controller 60 through a microphone 34 (FIG. 2) mounted in the grip 18 and electrically coupled with the controller 60.

The controller 60 can be adapted to actuate the microphone 34 and the storage process in response to a preselected actuation pattern for the actuation switch 32. For example, two quick depressions of the actuation switch 32 can signal the microphone 34 and controller 60 to initiate recording and storage of a message. Three quick depressions of the actuation switch 32 can signal the microphone 34 and controller 60 to stop recording and storage of the message. The grip 18 can also be provided with an indicator light 36 which can be coupled with the controller 60 to glow when a message is being recorded through the microphone 34.

An operator proceeding to start the vehicle can grasp the grip 18 as with any other ignition key, and insert the key 10 in the ignition switch 14. As the operator rotates the key 10 to start the vehicle, the actuation switch 32 will be depressed, and the message will be broadcast, thereby providing a reminder to the operator to, for example, fasten the seatbelt.

The key 10 and the ignition switch 14 can be adapted so that, as the key 10 is rotated to a selected position, such as the "accessory" position, an electrical signal, or pulse, can be transmitted from the ignition switch 14 through the shank portion 16 to the controller 60. In this embodiment, the shank portion 16 can be electrically coupled with the controller 60. The controller 60 can process the signal and generate a message triggered by the signal to be delivered through the speaker 66.

Figure 5:
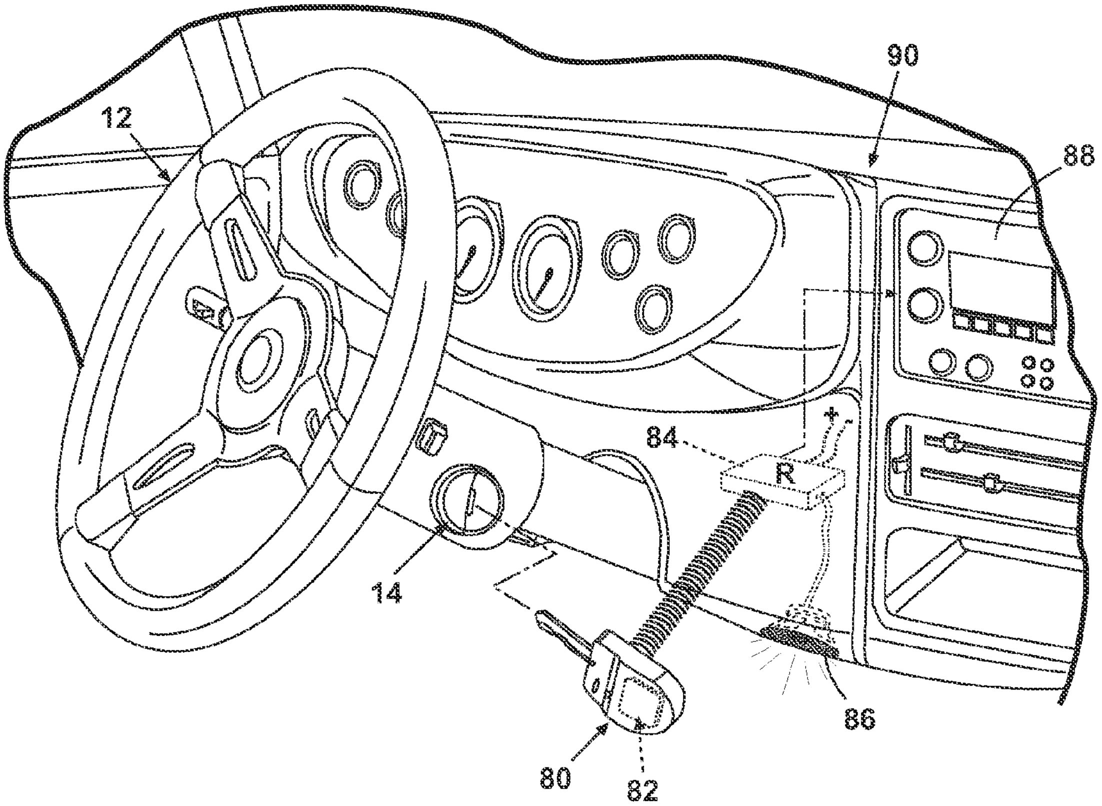
FIG. 5 is a perspective view of a second embodiment of the message-generating ignition key for wirelessly transmitting a message-generating signal according to the invention.

Referring now to FIG. 5, a second embodiment of the invention is illustrated comprising a message-generating ignition key 80 sharing many of the elements of the ignition key 10, such as a chamber 46, a controller chamber 48, a controller 60, a battery 62, a wiring harness 72, an actuation switch 32, and the like. However, the ignition key 80 has a message generator comprising a known wireless transmitter 82 substituted for the speaker 66 and electrically coupled with the controller 60, which can be housed in the chamber 46 in a manner similar to the speaker 66.

A wireless receiver 84 adapted to receive wireless signals from the transmitter 82 can be mounted in the vehicle in a suitable location, such as behind the vehicle dashboard 90. The receiver 84 can be electrically coupled with the vehicle power supply, and can comprise suitable components, such as an antenna, a processor, and memory for receiving and processing signals transmitted from the transmitter 82. The receiver 84 can be an after-market installation, manufacturer's original equipment, or a component of an OEM vehicle computer system.

The receiver 84 can be coupled with a speaker for broadcasting a selected message, such as a dedicated speaker 86 mounted near the receiver 84 and electrically coupled with the receiver 84. Alternately, the receiver 84 can be electrically coupled with a vehicle entertainment system 88. For example, the receiver 84 can be electrically coupled with the entertainment system 88 to utilize the entertainment system 88 as an amplifier for amplifying the message. The receiver 84 can also be electrically coupled with one or more of the speakers comprising part of the entertainment system 88. In this latter case, the receiver 84 can include an amplifier for amplification of the message.

When the ignition key 80 is inserted into the ignition switch 14 and rotated, the operator will depress the actuation switch 32 as previously described, triggering the transmission of a signal from the transmitter 82 to the receiver 84. The signal can comprise a triggering signal or pulse which triggers the receiver 84 to process and generate a selected message for broadcasting through the speaker 86 or entertainment system 88. Alternately, the signal can comprise the actual message, which is received by the receiver 84 and transmitted through the speaker 86 or entertainment system 88.

Figure 6:
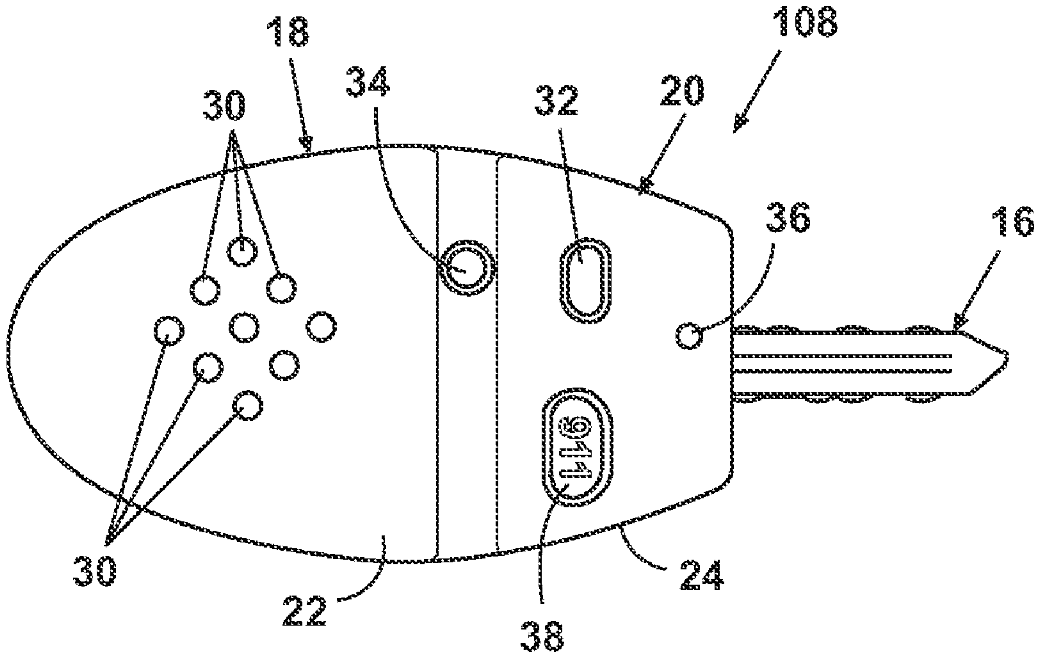
FIG. 6 is an enlarged plan view of a third embodiment of the message-generating ignition key comprising an emergency notification function.

FIG. 6 illustrates a third embodiment of the invention comprising a message-generating ignition key 108 similar to the ignition key 10 and comprising a second actuation switch 38 incorporated into the grip 18 similar to the actuation switch 32. The ignition key 108 shares many of the elements of the ignition key 10, such as a chamber 46, a controller chamber 48, a controller 60, a battery 62, a wiring harness 72, an actuation switch 32, a speaker 66 electrically coupled with the controller 60, and the like. The actuation switch 38 can be coupled with the controller 60 to actuate the transmission of a signal or message to a public emergency response system, such as a "911" system and the like. The transmission of the signal or message can be initiated by operating the actuation switch 38 in a preselected pattern, such as depressing the switch 3 times in quick succession, to reduce the potential for erroneously signaling the emergency response system by an inadvertent actuation of the switch 38.

Figure 7:
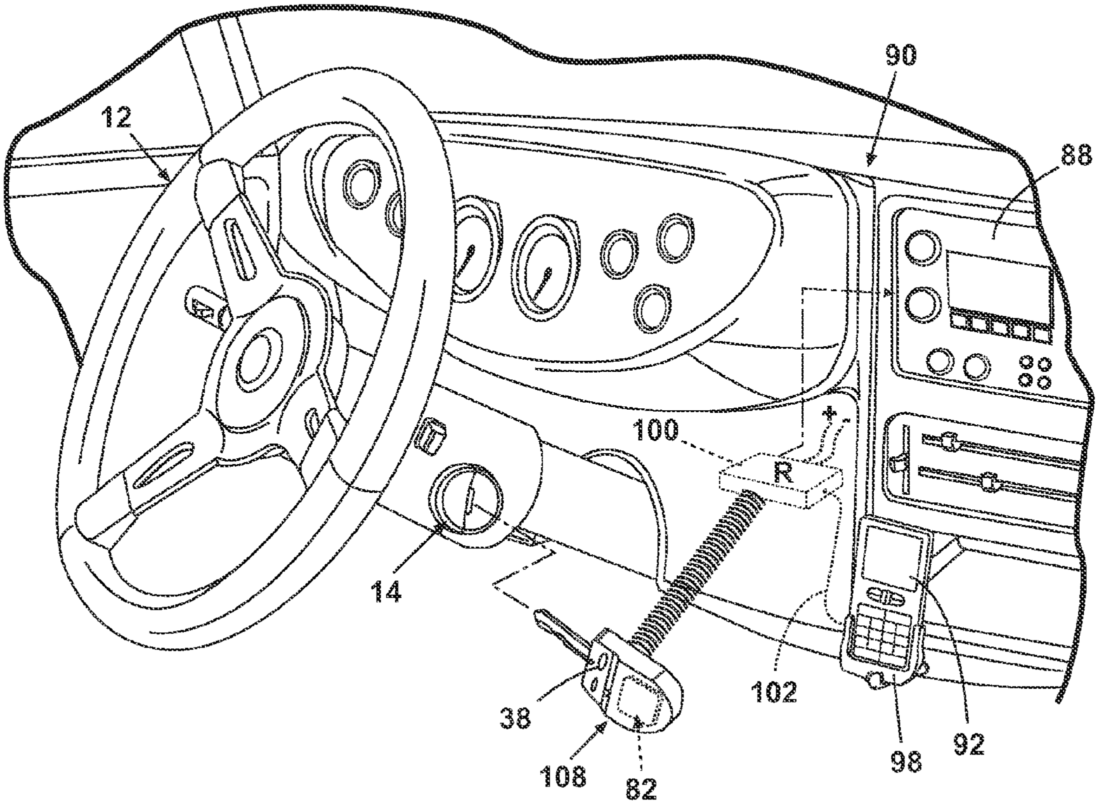
FIG. 7 is a perspective view of a motorized vehicle steering assembly and the third embodiment of a message-generating ignition key according to the invention.

As illustrated in FIG. 7, the signal from the key 108 can be transmitted to an emergency receiver 100 mounted in the vehicle, and coupled through an electrical lead 102 to a vehicle-based mobile phone 92 stored in a cradle 98. Alternatively, the emergency receiver 100 can be coupled wirelessly to the mobile phone 92. The mobile phone 92 can be adapted to call the emergency response system in response to the transmission of the signal. Alternately, the signal from the key 108 can be transmitted to a vehicle-based private emergency response system, such as the On Star® system. The key 108 can be adapted to initiate the transmission of the signal or message to the emergency response system from outside the vehicle, thereby providing a zone of safety around the exterior of the vehicle.

Figure 8:
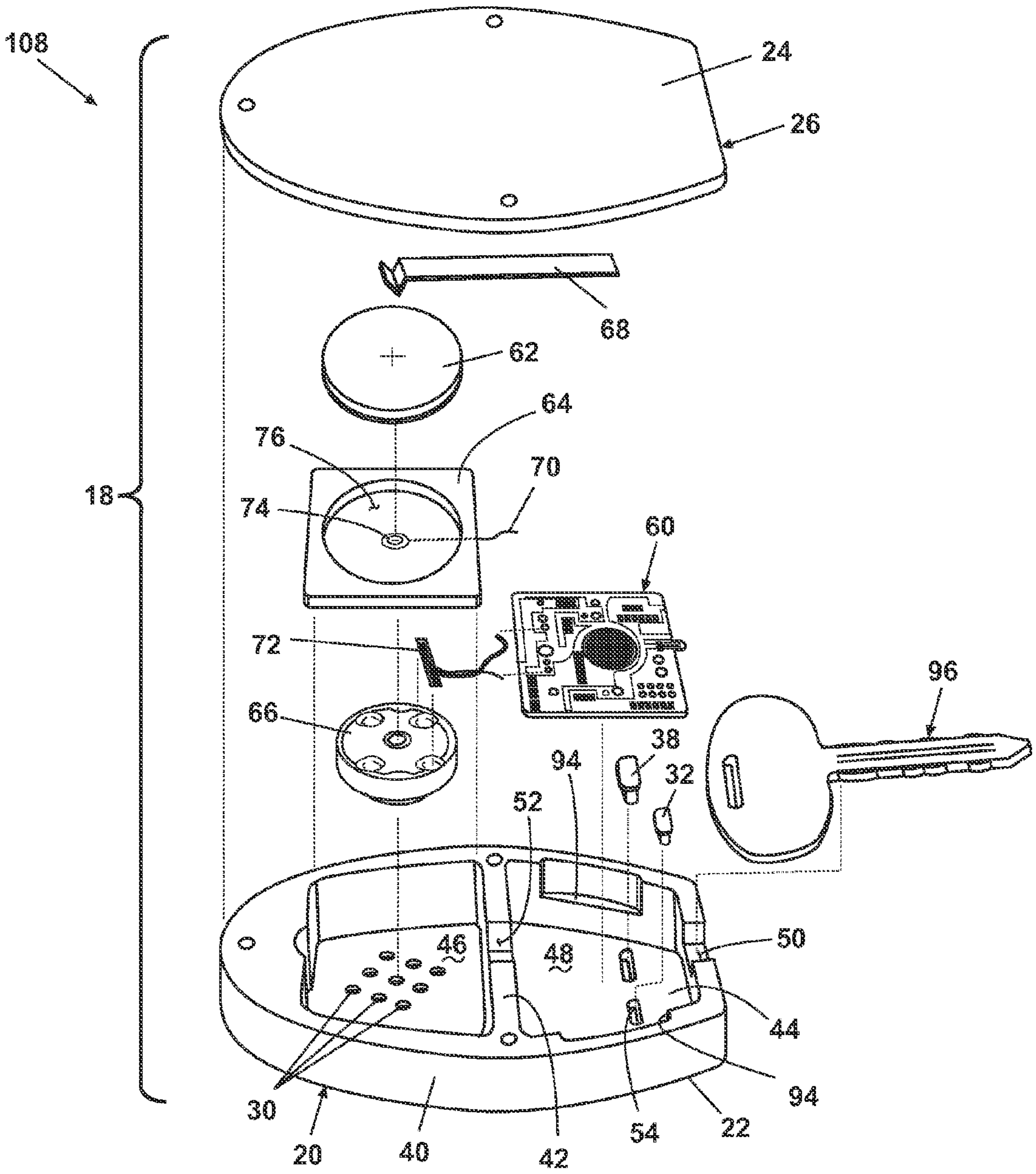
FIG. 8 is an exploded view similar to FIG. 4 of a fourth embodiment of the message-generating ignition key showing the housing adapted for coupling with an original equipment ignition key.

FIG. 8 illustrates a fourth embodiment of the ignition key 110 in which the grip 18 can be adapted to couple with a conventional OEM ignition key 96, rather than incorporating a shank portion 16. This is particularly well-suited for aftermarket incorporation of the message-generating ignition key 110 and messaging system into a vehicle. The grip housing 20 can be adapted with a suitable seat or receptacle 94 into which the grip of the OEM ignition key 96 can be inserted. The key 96 can be securely coupled into the receptacle 94 by using, for example, a snap-fit or friction-fit mechanism. Alternately, the grip of the OEM key 96 can be modified into a preselected configuration by, for example, the service department of a vehicle dealer, for coupling with the grip housing. Other means of coupling the OEM key with the housing will be evident to a person of ordinary skill.

In yet another embodiment, the ignition key can be fabricated entirely as an OEM ignition key, having the power source, controller, actuation switches, speaker or transmitter, and related electrical components incorporated into the grip of the key by the manufacturer, and provided with the vehicle upon sale.

The message-generating ignition key provides a valuable safety enhancement for motorized vehicles by generating a message broadcast to the occupants of the vehicle, reminding the occupants to take a particular action, such as fastening a seatbelt, checking the oil, or not driving under selected conditions. The message-generating ignition key is more effective than a key that simply triggers a tone or other sound since a spoken message will have greater impact than a tone. The message can be prerecorded, or can be selectively recorded by the operator and stored in memory based upon the operator's preference.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A vehicle ignition key for use by an occupant of a vehicle, comprising:

a shank portion for coupling with a vehicle ignition switch;

a grip portion securely attached to said shank portion and including a housing defining at least one chamber therein, said housing including an exterior housing surface;

at least one electric actuation switch integrated into said housing and including a switch contact surface complementary with said exterior housing surface to facilitate actuating said actuation switch when said grip portion is grasped and said vehicle ignition key is rotated in an ignition switch;

a digital message controller electrically coupled with said at least one electric actuation switch, said digital message controller including memory for storing digitized data therein and a processor for processing said digitized data;

a power source electrically coupled with and supplying power to said at least one electric actuation switch and said digital message controller; and a message generator electrically coupled with said digital message controller for transmitting a message to an occupant of a vehicle;

wherein said at least one chamber can hold at least one of said digital message controller, said power source, and said message generator; and wherein said at least one electric actuation switch is actuated to initiate processing of said stored digitized data and transmission of said processed digitized data from said digital message controller to said message generator upon rotation of said vehicle ignition key in a vehicle ignition switch.

2. A vehicle ignition key assembly comprising:

a vehicle ignition key including a shank portion for coupling with a vehicle ignition switch and a head portion for grasping by an operator of a vehicle; and a grip portion for securely enclosing said head portion therein, said grip portion including a housing defining at least one chamber therein, said housing including an exterior housing surface;

at least one electric actuation switch integrated into said housing and including a switch contact surface complementary with said exterior housing surface to facilitate actuating said actuation switch when said grip portion is grasped and said vehicle ignition key is rotated in an ignition switch;

a digital message controller electrically coupled with said at least one electric actuation switch, said digital message controller including memory for storing digitized data therein and a processor for processing said digitized data;

a power source electrically coupled with and supplying power to said at least one electric actuation switch and said digital message controller; and a message generator electrically coupled with said digital message controller for transmitting a message to an occupant of a vehicle;

wherein said head portion is mechanically attached to said grip portion, and wherein said shank portion is electrically isolated from said grip portion.

3. A key grip for coupling with a vehicle ignition key, said vehicle ignition key including a shank portion for functional engagement with a vehicle ignition switch and a head portion for grasping by an operator of a vehicle, said key grip comprising:

a housing defining at least one chamber therein, said housing including an exterior housing surface;

at least one electric actuation switch integrated into said housing and including a switch contact surface complementary with said exterior housing surface to facilitate actuating said actuation switch when said key grip is grasped and said vehicle ignition key is rotated in a vehicle ignition switch;

a digital message controller electrically coupled with said at least one electric actuation switch, said digital message controller including memory for storing digitized data therein and a processor for processing said digitized data;

a power source electrically coupled with and supplying power to said at least one electric actuation switch and said digital message controller;

a message generator electrically coupled with said digital message controller for transmitting a message to an occupant of a vehicle; and an antenna electrically coupled with said digital message controller;

wherein an ignition key head portion can be selectively encased within said at least one chamber and removed from said at least one chamber; and wherein, when an ignition key head portion is selectively encased within said at least one chamber, said at least one electric actuation switch is actuated upon grasping of said key grip and rotation of said vehicle ignition key in a vehicle ignition switch to initiate processing of said stored digitized data and transmission of said processed digitized data from said digital message controller to said message generator; and wherein said message can be transmitted from said key grip through said antenna independently of said encasement and removal of said ignition key head portion.

4. A vehicle ignition key according to claim 2 wherein said message generator generates said message as said vehicle ignition key is rotated in a vehicle ignition switch.

5. A vehicle ignition key according to claim 1 wherein said digital message controller is one of a circuit board, a microprocessor, and an integrated circuit.

6. A vehicle ignition key according to claim 1 wherein said memory is one of read-only memory, random-access memory, and flash memory.

7. A vehicle ignition key according to claim 1 wherein said message generator is one of a speaker and a wireless transmitter.

8. A vehicle ignition key according to claim 7 wherein actuation of said electric actuation switch initiates said processing of said digitized data by said processor and said transmission of said processed digitized data to one of said speaker and said wireless transmitter.

9. A vehicle ignition key according to claim 7, and further comprising a receiver for receiving said processed digitized data from said wireless transmitter, and a remote speaker electrically coupled with said receiver, both said receiver and said remote speaker being located remotely from a vehicle ignition switch.

10. A vehicle ignition key according to claim 9 wherein said processed digitized data delivered to said wireless transmitter is sent to said receiver and broadcast from said remote speaker as a spoken message.

11. A vehicle ignition key according to claim 9 wherein said remote speaker is a vehicle radio speaker.

12. A vehicle ignition key according to claim 11 wherein said receiver is a vehicle radio receiver.

13. A vehicle ignition key according to claim 1, and further comprising a microphone mounted in said grip portion for recording a message to be stored in said memory on said digital message controller.

14. A vehicle ignition key according to claim 1 wherein said at least one chamber can hold a head of an original equipment vehicle ignition key.

15. A vehicle ignition key according to claim 7 wherein said wireless transmitter can transmit a signal to an emergency response system.

16. A vehicle ignition key according to claim 15 wherein said signal from said wireless transmitter can be transmitted from a mobile phone.

17. A vehicle ignition key according to claim 1 wherein said message from said vehicle ignition key can be transmitted from a mobile phone.

* * * * *